US012800900B2

(12) United States Patent
Yang

(10) Patent No.: US 12,800,900 B2
(45) Date of Patent: Nov. 17, 2026

(54) PARALLAX-BASED AUTOMATIC FOCUSING AND FOCUS LOCKING METHOD FOR LIGHT FIELD MICROSCOPY SYSTEM

(71) Applicant: Zhejiang Hehu Technology Co., Ltd., Hangzhou (CN)

(72) Inventor: Yi Yang, Hangzhou (CN)

(73) Assignee: Zhejiang Hehu Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/287,815

(22) Filed: Aug. 1, 2025

(65) Prior Publication Data

US 2026/0227619 A1 Aug. 6, 2026

(30) Foreign Application Priority Data

Aug. 1, 2024 (CN) ........................ 202411046979.6

(51) Int. Cl.
*G02B 21/24* (2006.01)
*H04N 13/236* (2018.01)
(Continued)

(52) U.S. Cl.
CPC ......... *G02B 21/244* (2013.01); *H04N 13/236* (2018.05); *H04N 23/672* (2023.01); *H04N 23/957* (2023.01)

(58) Field of Classification Search
CPC .. G02B 21/244; G02B 21/002; H04N 23/672; H04N 23/957; H04N 25/61; H04N 25/615
See application file for complete search history.

(56) References Cited

U.S. PATENT DOCUMENTS 10,634,895 B2 * 4/2020 Kobayashi ............. G02B 7/287
2005/0121596 A1 * 6/2005 Kam ...................... G02B 7/365 250/201.2

(Continued)

OTHER PUBLICATIONS

CNIPA, Notification of First Office Action for Chinese application CN202411046979.6, Sep. 5, 2024.

(Continued)

*Primary Examiner* — Marly S Camargo
(74) *Attorney, Agent, or Firm* — Hemisphere Law, PLLC

(57) ABSTRACT

A parallax-based automatic focusing and focus-locking method for a light field microscopy system includes using the light field microscopy system to shoot at the position of the defocus distance of a sample to obtain four-dimensional phase space data, using cross-correlation to calculate the parallax of each view relative to a central view of the four-dimensional phase space data, and calculating a two-dimensional defocus coefficient matrix of the light field microscopy system based on the parallaxes and the defocus distance; using the light field microscopy system to shoot the sample at the current shooting distance to obtain the current two-dimensional parallax matrix of the sample; performing linear fitting on the two-dimensional parallax matrix S and the two-dimensional defocus coefficient matrix K to obtain the current defocus value of the sample; and adjusting the current shooting distance in real time according to the defocus value until focusing and/or focus locking is completed.

6 Claims, 1 Drawing Sheet

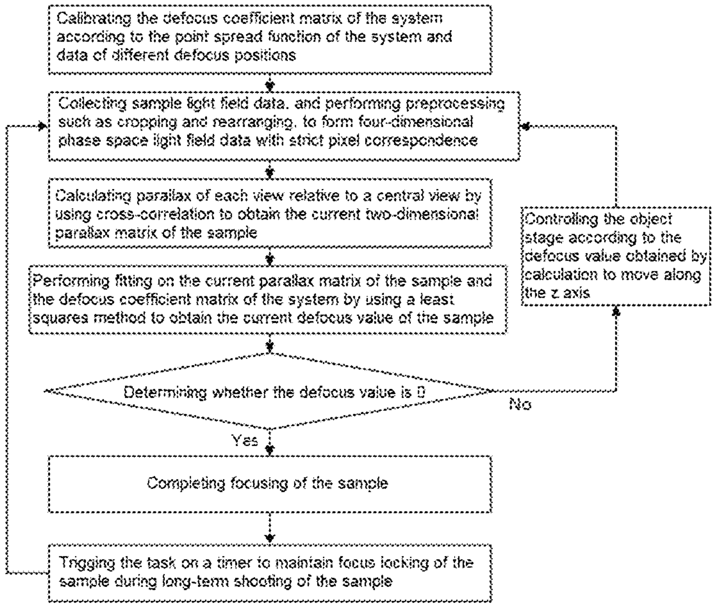

(51) Int. Cl.

| | |
|---|---|
| ***H04N 23/67*** | (2023.01) |
| ***H04N 23/957*** | (2023.01) |
| ***H04N 25/61*** | (2023.01) |
| ***H04N 25/615*** | (2023.01) |

(56) References Cited

U.S. PATENT DOCUMENTS

| | | | | |
|---|---|---|---|---|
| 2012/0133819 | A1 | 5/2012 | Liu et al. | |
| 2012/0182406 | A1* | 7/2012 | Woo | H04N 13/398 348/54 |
| 2017/0090175 | A1 | 3/2017 | Kobayashi | |
| 2017/0302844 | A1* | 10/2017 | Nakamoto | G02B 7/34 |
| 2021/0006707 | A1 | 1/2021 | Xu | |
| 2023/0254563 | A1* | 8/2023 | Voorst Vader | H04N 23/56 |
| 2026/0038097 | A1* | 2/2026 | Yang | G06T 5/70 |

OTHER PUBLICATIONS

CNIPA, Notification to grant patent right for Chinese application CN202411046979.6, Dec. 29, 2024.

* cited by examiner

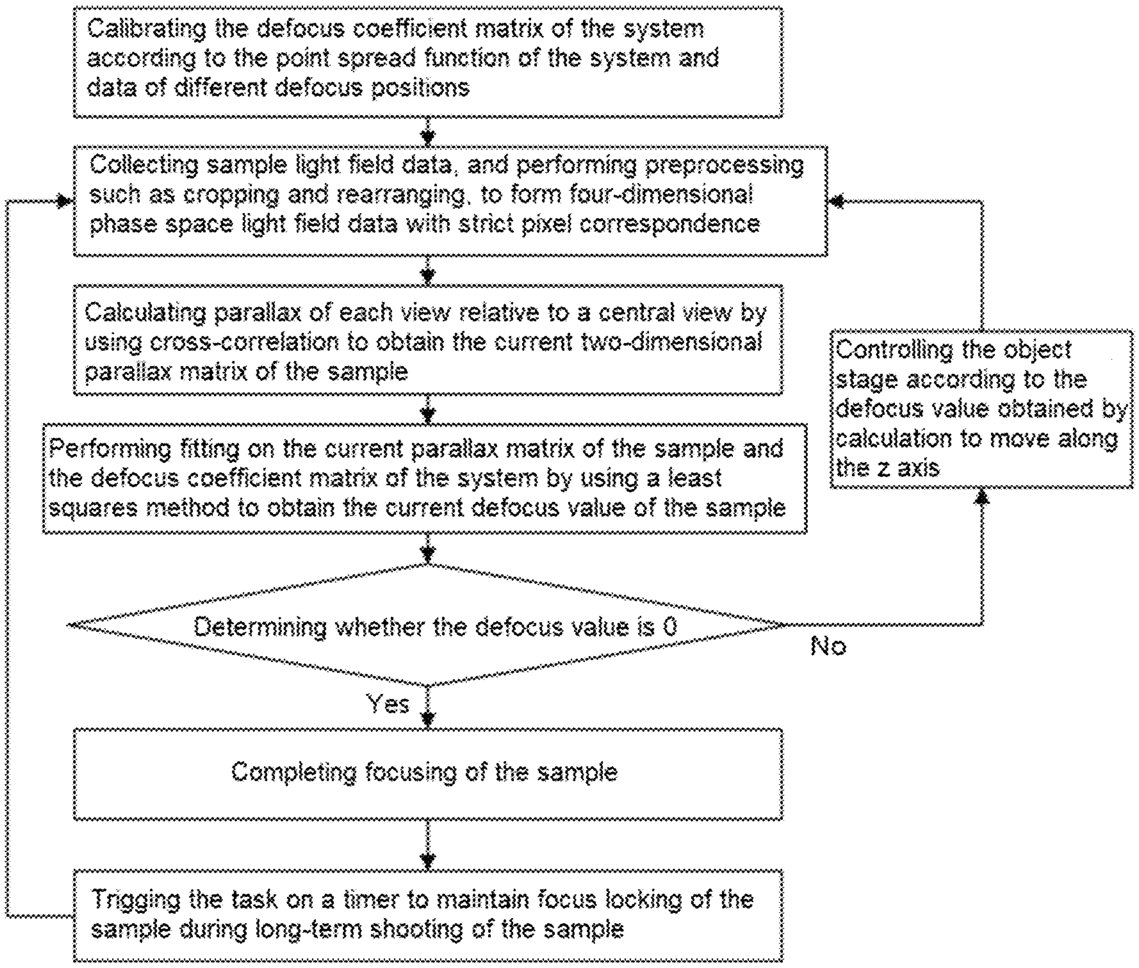
Calibrating the defocus coefficient matrix of the system according to the point spread function of the system and data of different defocus positions
Collecting sample light field data, and performing preprocessing such as cropping and rearranging, to form four-dimensional phase space light field data with strict pixel correspondence
Calculating parallax of each view relative to a central view by using cross-correlation to obtain the current two-dimensional parallax matrix of the sample
Performing fitting on the current parallax matrix of the sample and the defocus coefficient matrix of the system by using a least squares method to obtain the current defocus value of the sample
Determining whether the defocus value is 0
No
Controlling the object stage according to the defocus value obtained by calculation to move along the z axis
Yes
Completing focusing of the sample
Trigging the task on a timer to maintain focus locking of the sample during long-term shooting of the sample

PARALLAX-BASED AUTOMATIC FOCUSING AND FOCUS LOCKING METHOD FOR LIGHT FIELD MICROSCOPY SYSTEM

CROSS REFERENCE TO RELATED APPLICATIONS

The present disclosure claims the priority to the Chinese patent application with the filing No. 202411046979.6, entitled "PARALLAX-BASED AUTOMATIC FOCUSING AND FOCUS LOCKING METHOD FOR LIGHT FIELD MICROSCOPY SYSTEM" and filed on Aug. 1, 2024 with the Chinese Patent Office, the contents of which are incorporated herein by reference in their entirety.

TECHNICAL FIELD

The present disclosure relates to the technical field of multi-color light field microscopic imaging, and in particular, to a parallax-based automatic focusing and focus locking method for a light field microscopic system.

BACKGROUND ART

Light field microscopy is a new type of microscopic imaging technology, which can obtain three-dimensional images by recording the light field information of an object, without mechanical scanning, and has broad application prospects in biomedicine and other fields. However, the image clarity quality of the light field microscopy depends to a great extent on the relative position between the microscope objective and the sample, that is, the working distance. If the working distance is not appropriate, the image may be defocused and blurred, making it difficult to meet the needs of subsequent analysis. Although the image may be focused at the beginning of the shooting, the living sample may inevitably deviate from the focal plane during long-term shooting, resulting in blurred images.

Although automatic focusing technologies are currently available, most of them are based on image clarity analysis and require multiple times of imaging and comparison at different focal planes, and thus are slow in speed, may cause phototoxic damage to the sample, and cannot achieve the focus locking function for long-term shooting.

Therefore, a technical problem to be urgently solved by those skilled in the art is how to provide a parallax-based automatic focusing and focus locking method for a light field microscopy system which realizes fast automatic focusing of the light field microscopy system.

SUMMARY

In view of the above research status and existing problems, the present disclosure provides a parallax-based automatic focusing and focus locking method for a light field microscopy system, which can realize fast automatic focusing of the light field microscopy system and the focus locking function during long-term shooting by analyzing the parallax characteristics of the light field images.

The present disclosure provides a parallax-based automatic focusing and focus locking method for a light field microscopy system, where the light field microscopy system includes a microlens array for acquiring multi-view information of an image; the method includes the following steps:

a defocus coefficient matrix calibration step:

shooting at a position of the defocus distance z of a sample by using the light field microscopy system, to obtain first two-dimensional original light field data containing four-dimensional information; and rearranging the first two-dimensional original light field data into first four-dimensional phase space data, calculating parallax of each view relative to a central view of the first four-dimensional phase space data by using cross-correlation, and calculating and obtaining the two-dimensional defocus coefficient matrix K of the light field microscopy system based on the parallaxes and the defocus distance z; and a sample focusing and focus locking step:

shooting the sample at a current shooting distance by using the light field microscopy system, to obtain second two-dimensional original light field data containing four-dimensional information;

rearranging the second two-dimensional original light field data into second four-dimensional phase space data, and calculating parallax of each view relative to a central view of the second four-dimensional phase space data by using cross-correlation, to obtain a current two-dimensional parallax matrix S of the sample;

performing linear fitting on the two-dimensional parallax matrix S and the two-dimensional defocus coefficient matrix K to obtain a current defocus value of the sample; and adjusting the current shooting distance in real time according to the defocus value until focusing and/or focus locking is completed.

Preferably, in the defocus coefficient matrix calibration step, the step of rearranging the first two-dimensional original light field data into first four-dimensional phase space data includes:

rearranging the first two-dimensional original light field data to obtain rearranged sub-images of multiple views of a shape $v_i$*h*w, where $v_i$ indicates the i-th view in the rearranged images of multiple views, and h and w indicate the pixel height and the pixel width of each sub-image, respectively.

Preferably, the step of calculating parallax of each view relative to a central view of the first four-dimensional phase space data by using cross-correlation includes:

$$R_{u,v}(m, n) = \sum_x \sum_y W_1(x, y, u, v) W_1(x + m, y + n, u_0, v_0);$$

$$S_0(u, v) = \arg\max R_{u,v}(m, n);$$

in the above, u and v represent the longitudinal and lateral angular coordinates of a single microlens respectively, the value ranges of m and n are [0,w] and [0,h] respectively, h and w indicate the pixel height and the pixel width of each sub-image respectively, $W_1$ indicates the first four-dimensional phase space data; and $u_0$ and $v_0$ represent the longitudinal and lateral angular coordinates of the central view respectively.

Preferably, the step of calculating and obtaining the two-dimensional defocus coefficient matrix K of the light field microscopy system based on the parallaxes and the defocus distance z includes:

dividing all parallaxes by the defocus distance z to calculate and obtain the two-dimensional defocus coefficient matrix K of the light field microscopy system.

Preferably, in the sample focusing and focus locking step, the step of performing linear fitting on the two-dimensional parallax matrix S and the two-dimensional defocus coefficient matrix K includes: performing linear fitting on the two-dimensional parallax matrix S of the sample and the two-dimensional defocus coefficient matrix K of the system by using a least squares method to obtain the current defocus value of the sample.

Preferably, the step of adjusting the current shooting distance in real time according to the defocus value until focusing is completed includes:

determining whether the defocus value is equal to 0, where if yes, the sample is in the focal plane and the focusing is completed; and if not, the current shooting distance is adjusted according to the defocus value, and the sample focusing and focus locking step is executed repeatedly until the defocus value is equal to 0, then the focusing of the sample is completed.

Preferably, the step of adjusting the current shooting distance in real time according to the defocus value until focus locking is completed includes:

setting a trigger condition of the focusing step during a long-term shooting process of the sample, and automatically executing the focusing step in real time to complete the focus locking in the long-term process, where the long-term shooting process of the sample refers to a shooting process in which the shooting duration is greater than a preset value.

Preferably, the setting the triggering condition of the focusing step includes setting a timer to trigger the focusing step.

Compared with the prior art, it has the following beneficial effects:

the present disclosure realizes automated processing, and faster and more efficient focusing; and the present disclosure utilizes the parallax characteristics of light field data acquired by the light field microscopy system to achieve fast automatic focusing and focus locking for long-term shooting of living body.

BRIEF DESCRIPTION OF DRAWINGS

In order to more clearly illustrate the technical solutions of the embodiments of the present disclosure or in the prior art, the drawings required to be used in description of the embodiments or the prior art are briefly introduced below. Obviously, the drawings described below are only embodiments of the present disclosure, and for those ordinarily in the art, other drawings may be obtained based on the provided drawings without paying creative work.

The sole FIGURE is a flowchart of a parallax-based automatic focusing and focus locking method for a light field microscopy system according to an embodiment of the present disclosure.

DETAILED DESCRIPTION OF EMBODIMENTS

The technical solutions in the embodiments of the present disclosure will be clearly and completely described below in conjunction with the drawings in the embodiments of the present disclosure. Obviously, the described embodiments are only some of the embodiments of the present disclosure, not all of the embodiments. Based on the embodiments of the present disclosure, all other embodiments obtained by those ordinarily skilled in the art without creative work are within the scope of protection of the present disclosure.

The light field microscopy system includes a microlens array. The light field microscope uses the microlens array to record light field information and can obtain sub-images of multiple views at the same time. The positions of the object point on the focal plane remains consistent in the sub-images of different views, while the object point on the defocused plane may produce parallax. Therefore, by analyzing the parallax characteristics of the light field image, fast automatic focusing can be achieved.

The embodiments of the present disclosure disclose a parallax-based automatic focusing and focus locking method for a light field microscopy system, as shown in the sole FIGURE, which uses the parallax characteristics of light field data acquired by the light field microscopy system to realize automatic focusing and focus locking functions. The execution steps are as follows:

defocus coefficient matrix calibration step:

shooting at a position of the defocus distance z of a sample by using the light field microscopy system, to obtain first two-dimensional original light field data containing four-dimensional information; and rearranging the first two-dimensional original light field data into first four-dimensional phase space data, calculating parallax of each view relative to a central view of the first four-dimensional phase space data by using cross-correlation, and calculating and obtaining the two-dimensional defocus coefficient matrix K of the light field microscopy system based on the parallaxes and the defocus distance z;

sample focusing and focus locking step:

shooting the sample at a current shooting distance by using the light field microscopy system, to obtain second two-dimensional original light field data containing four-dimensional information;

rearranging the second two-dimensional original light field data into second four-dimensional phase space data $W_2$, and calculating parallax of each view relative to a central view of the second four-dimensional phase space data by using cross-correlation, to obtain a current two-dimensional parallax matrix S of the sample;

performing linear fitting on the two-dimensional parallax matrix S and the two-dimensional defocus coefficient matrix K to obtain a current defocus value of the sample; and adjusting the current shooting distance in real time according to the defocus value until focusing and/or focus locking is completed.

It should be noted that the two-dimensional defocus coefficient matrix K is used to characterize the parallax of each view of the four-dimensional phase space data caused by each unit defocus distance of the sample.

In the embodiment, the method of rearranging to obtain the second four-dimensional phase space data is the same as the method of rearranging to obtain the first four-dimensional phase space data, and the cross-correlation method used to calculate the parallax of each view relative to the central view of the second four-dimensional phase space data is the same as the cross-correlation method used to calculate the parallax of each view relative to the central view of the first four-dimensional phase space data.

In one embodiment, the step of rearranging the first two-dimensional original light field data into first four-dimensional phase space data includes:

rearranging the first two-dimensional original light field data to obtain rearranged sub-images of multiple views of a shape $v_i$*h*w, where $v_i$ is the i-th view in the rearranged images of multiple views, and h and w indicate the pixel height and the pixel width of each sub-image, respectively.

In a specific implementation, the longitudinal dimension and the lateral dimension of the two-dimensional light field image are u*h and v*w, respectively, where h and w represent the longitudinal and lateral spatial coordinates in the microlens array light field imaging system respectively, and u and v represent the longitudinal and lateral angular coordinates of a single microlens, respectively.

The angular coordinate is fixed, and the pixel values of the angular coordinate under different spatial coordinates are obtained to form the spatial coordinate sub-image of the angular coordinate; and the spatial coordinate sub-images of all angular coordinates are arranged in sequence to jointly form the four-dimensional phase space light field data $W_1$ of the two-dimensional light field image.

In this embodiment, the rearrangement method includes pre-processing steps such as cropping and alignment.

In one embodiment, the step of calculating parallax $S_0$ of each view (u, v) relative to a central view ($u_0$, $v_0$) of the first four-dimensional phase space data by using cross-correlation includes:

$$R_{u,v}(m, n) = \sum_x \sum_y W_1(x, y, u, v) W_1(x + m, y + n, u_0, v_0);$$

$$S_0(u, v) = \arg\max R_{u,v}(m, n);$$

In the above, u and v represent the longitudinal and lateral angular coordinates of a single microlens respectively, the value ranges of m and n are [0,w] and [0,h] respectively, h and w indicate the pixel height and the pixel width of each sub-image respectively, $W_1$ indicates the first four-dimensional phase space data; and $u_0$ and $v_0$ represent the longitudinal and lateral angular coordinates of the central view respectively.

In one embodiment, the step of calculating and obtaining the two-dimensional defocus coefficient matrix K of the light field microscopy system based on the parallaxes and the defocus distance z includes:

dividing each of the parallaxes by the defocus distance z to calculate and obtain the two-dimensional defocus coefficient matrix K of the light field microscopy system:

$$K(u, v) = S_0(u, v)/z.$$

In one embodiment, the step of performing linear fitting on the two-dimensional parallax matrix S and the two-dimensional defocus coefficient matrix K includes: performing linear fitting on the two-dimensional parallax matrix S of the sample and the two-dimensional defocus coefficient matrix K of the system by using a least squares method to obtain the current defocus value defocus of the sample:

$$S = \text{defocus} * K.$$

In one embodiment, the step of adjusting the current shooting distance in real time according to the defocus value until focusing is completed includes:

determining whether the defocus value is equal to 0, where if yes, the sample is in the focal plane and the focusing is completed; and if not, the current shooting distance is adjusted according to the defocus value, and the sample focusing and focus locking step is executed repeatedly until the defocus value is equal to 0, then the focusing of the sample is completed.

In one embodiment, the step of adjusting the current shooting distance in real time according to the defocus value until focus locking is completed includes:

setting a trigger condition of the focusing step during a long-term shooting process of the sample, and automatically executing the focusing step in real time to complete the focus locking in the long-term process, where the long-term process refers to that the shooting duration is greater than a preset value.

In one embodiment, the setting the triggering condition of the focusing step includes setting a timer to trigger the focusing step.

In one embodiment, the process of adjusting the current shooting distance that the light field microscopy system is from the sample when shooting the second two-dimensional original light field data of the sample includes: controlling a sample (object) stage to move along the vertical Z axis and in a direction close to or away from the shooting component of the light field microscopy system.

The above embodiments of the present disclosure realize fast automatic focusing of the sample by analyzing the parallax characteristics of the four-dimensional phase space of the defocused plane light field data, and maintains continuous accurate focusing of the sample, obtains clear image, and realizes the function of long-term focus locking in the application scenarios of long-term shooting of a living body.

The parallax-based automatic focusing and focus locking method for a light field microscopy system provided by the present disclosure is introduced in detail above. Specific examples are used herein to illustrate the principles and implementations of the present disclosure. The description of the above embodiments is only used to help understand the method of the present disclosure and its core idea. Meanwhile, for those ordinarily skilled in the art, there will be changes in both the specific implementation and application range according to the idea of the present disclosure. In summary, the content of the specification should not be understood as a limitation on the present disclosure.

Here, relational terms such as first and second, etc. are used only to distinguish one entity or operation from another entity or operation, and do not necessarily require or imply any such actual relationship or order between these entities or operations. Moreover, the terms "include", "comprise" or any other variations thereof are intended to cover non-exclusive inclusion, so that a process, method, article or device that includes a series of elements includes not only those elements, but also other elements that are not explicitly listed, or also includes elements inherent to such process, method, article or device. In the absence of more restrictions, the elements defined by the sentence "comprises a . . . " do not exclude the existence of other identical elements in the process, method, article or device that includes the elements.

The invention claimed is:

1. A parallax-based automatic focusing and focus locking method for a light field microscopy system, wherein the light field microscopy system comprises a microlens array configured for acquiring multi-view information of an image; and the method comprises following steps:

a defocus coefficient matrix calibration step:

shooting at a position of a defocus distance z of a sample by using the light field microscopy system, to obtain first two-dimensional original light field data containing four-dimensional information, and rearranging into first four-dimensional phase space data;

calculating parallax of each view relative to a central view of the first four-dimensional phase space light field data by using cross-correlation, comprising:

wherein the step of calculating parallax of each view relative to the central view of the first four-dimensional phase space light field data by using cross-correlation comprises:

$$R_{u,v}(m, n) = \sum_x \sum_y W_1(x, y, u, v) W_1(x+m, y+n, u_0, v_0);$$

$$S_0(u, v) = \arg\max R_{u,v}(m, n);$$

wherein u and v represent longitudinal and lateral angular coordinates of a single microlens respectively, value ranges of m and n are [0,w] and [0,h] respectively, h and w indicate a pixel height and a pixel width of each sub-image respectively, $W_1$ indicates the first four-dimensional phase space data; and $u_0$ and $v_0$ represent longitudinal and lateral angular coordinates of the central view respectively; and calculating and obtaining a two-dimensional defocus coefficient matrix K of the light field microscopy system based on the parallaxes and the defocus distance z, comprising:

dividing each of the parallaxes by the defocus distance z to calculate and obtain the two-dimensional defocus coefficient matrix K of the light field microscopy system; and a sample focusing and focus locking step:

shooting the sample at a current shooting distance by using the light field microscopy system, to obtain second two-dimensional original light field data containing four-dimensional information;

rearranging the second two-dimensional original light field data into second four-dimensional phase space data, and calculating parallax of each view relative to a central view of the second four-dimensional phase space data by using cross-correlation, to obtain a current two-dimensional parallax matrix S of the sample;

performing linear fitting on the two-dimensional parallax matrix S and the two-dimensional defocus coefficient matrix K, to obtain a current defocus value of the sample; and adjusting the current shooting distance in real time according to the defocus value until focusing and/or focus locking is completed, comprising:

determining whether the defocus value is equal to 0, wherein if yes, the sample is in a focal plane and the focusing is completed; and if not, the current shooting distance is adjusted according to the defocus value, and the sample focusing and focus locking step is executed repeatedly until the defocus value is equal to 0, then the focusing of the sample is completed.

2. The parallax-based automatic focusing and focus locking method for a light field microscopy system according to claim 1, wherein in the defocus coefficient matrix calibration step, the step of rearranging the first two-dimensional original light field data into the first four-dimensional phase space light field data comprises:

rearranging the first two-dimensional original light field data to obtain rearranged sub-images of multiple views of a shape of $v_i$*h*w, wherein $v_i$ indicates an i-th view in the rearranged images of multiple views, and h and w indicate a pixel height and a pixel width of each sub-image, respectively.

3. The parallax-based automatic focusing and focus locking method for a light field microscopy system according to claim 1, wherein in the sample focusing and focus locking step, the step of performing linear fitting on the two-dimensional parallax matrix S and the two-dimensional defocus coefficient matrix K comprises: performing linear fitting on the two-dimensional parallax matrix S of the sample and the two-dimensional defocus coefficient matrix K of the system by using a least squares method to obtain a current defocus value of the sample.

4. The parallax-based automatic focusing and focus locking method for a light field microscopy system according to claim 1, wherein the step of adjusting the current shooting distance in real time according to the defocus value until the focus locking is complete comprises:

setting a trigger condition of the focusing step during a long-term shooting process of the sample, and automatically executing the focusing step in real time to complete the focus locking in the long-term process, wherein the long-term shooting process of the sample is a shooting process in which shooting duration is greater than a preset value.

5. The parallax-based automatic focusing and focus locking method for a light field microscopy system according to claim 4, wherein the setting the triggering condition of the focusing step comprises setting a timer to trigger the focusing step.

6. The parallax-based automatic focusing and focus locking method for a light field microscopy system according to claim 3, wherein the step of adjusting the current shooting distance in real time according to the defocus value until the focus locking is complete comprises:

setting a trigger condition of the focusing step during a long-term shooting process of the sample, and automatically executing the focusing step in real time to complete the focus locking in the long-term process, wherein the long-term shooting process of the sample is a shooting process in which shooting duration is greater than a preset value.

* * * * *